United States Patent
Koh et al.

(10) Patent No.: US 6,621,968 B1
(45) Date of Patent: Sep. 16, 2003

(54) OPTICAL FIBER FOR BROADBAND OPTICAL DEVICES AND OPTICAL FIBER DEVICES USING THEREOF

(75) Inventors: Yeon Wan Koh, Taejon (KR); Jin Ha Kim, Songnamshi (KR); Bong Wan Lee, Taejon (KR); Seok Hyun Yun, Taejon (KR); Byoung Yoon Kim, Taejon (KR); Kyung Hwan Oh, Seoul (KR)

(73) Assignee: Ultraband Fiber Optics, Inc., San Jose, CA (US)

( * ) Notice: Subject to any disclaimer, the term of this patent is extended or adjusted under 35 U.S.C. 154(b) by 0 days.

(21) Appl. No.: 09/601,934

(22) PCT Filed: Dec. 10, 1999

(86) PCT No.: PCT/KR99/00762

§ 371 (c)(1),
(2), (4) Date: Dec. 19, 2000

(87) PCT Pub. No.: WO00/34812

PCT Pub. Date: Jun. 15, 2000

(30) Foreign Application Priority Data

Dec. 10, 1998 (KR) .............................................. 98-54114

(51) Int. Cl.[7] .................................................. G02B 6/16
(52) U.S. Cl. ............................ 385/123; 385/7; 385/28; 385/124
(58) Field of Search ................................. 385/123, 28, 7, 385/37, 42, 12, 11, 124

(56) References Cited

U.S. PATENT DOCUMENTS

| | | | |
|---|---|---|---|
| 4,984,884 A | 1/1991 | Ryu et al. .................. | 356/73.1 |
| 5,802,234 A | 9/1998 | Vengsarkar et al. ........ | 385/123 |
| 6,151,157 A | 11/2000 | Ball et al. ................... | 359/341 |
| 6,151,427 A | 11/2000 | Satorius ......................... | 385/7 |
| 6,343,165 B1 * | 1/2002 | Kim et al. .................... | 385/28 |

FOREIGN PATENT DOCUMENTS

| | | |
|---|---|---|
| JP | 62-52509 | 7/1987 |
| JP | 63-52034 | 5/1988 |

OTHER PUBLICATIONS

P.M. Ramos et al., "All-optical pulse switching in twin-core fiber couplers with intermodal dispersion", IEEE J. Quantum Electronics, vol. 35, No. 6 (1999).

Cheng-Kuei Jen et al., "Backward collinear guided-wave-acusto-optic interactions in single-mode fibers", IEEE J. Lightwave Technology, vol. 7, No. 12, (1989).

J. Sharony et al., The universality of multidimensional switching networks, IEEE ACM Transactions on Networking, vol. 2, No. 6, (1994).

(List continued on next page.)

*Primary Examiner*—Phan T. H. Palmer
(74) *Attorney, Agent, or Firm*—Kenta Suzue; Wilson Sonsini Goodrich & Rosati

(57) ABSTRACT

The present invention relates to an optical fiber having a normalized frequency applicable to a broadband optical device, and to a broadband, polarization-independent, low-loss optical fiber device made by using the aforementioned optical fiber. The optical fiber of the present invention has a normalized frequency value V, structural parameters of which including a core radius, a core refractive index and a cladding refractive index are adjusted to minimize the beat dispersion between first and second modes in a predetermined frequency range. Various optical fiber devices may be achieved if the aforementioned optical fiber is used along with acoustic wave generating means and a mode dropper or a mode selective coupler.

12 Claims, 3 Drawing Sheets

OTHER PUBLICATIONS

Hyo Sang Kim et al., "Single–mode–fiber acousto–optic tunable notch filter with variable spectral profile," OFC/97, vol. 6, Feb. 16–21, 1997, Dallas Convention Center, Dallas, TX, pp. 395–398.

Sorin, W.V. et al, "Phase Velocity Measuerments using Prism Output for Single and Few–Mode Optical Fibers", *Optics Letters*, Feb. 1986, vol. 11, No. 2, pp. 106–108.

Blake, B.Y. et al, "Fiber–Optic Modal Coupler using Periodic Microbending", *Optics Letters*, Mar. 1986, vol. 11, No. 3, pp. 177–179.

Kim, B.Y. et al., "All–Fiber Acousto–Optic Frequency Shifter", *Optics Letters*, Jun. 1986, vol. 11, No. 6, pp. 389–391.

Sorin, W.R. et al, "Highly Selective Evanescent Modal Filter for Two–Mode Optical Fibers", *Optics Letters*, Sep. 1986, vol. 11, No. 9, pp. 581–583.

Blake, J.N. et al, "Analysis of Intermodal Coupling in a Two–Mode Fiber with Periodic Microbends", *Optics Letters*, Apr. 1987, vol. 12, No. 4, pp. 281–283.

Kim, B.Y. et al, "Use of Highly Elliptical Core Fibers for Two–Mode Fiber Devices", *Optics Letters*, Sep. 1987, vol. 12, No. 9, pp. 729–731.

Blake, J.N., et al, "Strain Effects on Highly Elliptical Core Two–Mode Fibers", *Optics Letters*, Sep. 1987, vol. 12, No. 9, pp. 732–734.

Engan, H.E. et al, Propagation and Optical Interaction of Guided Acoustic Waves in Two–Mode Optical Fibers, *IEEE Journal of Lightwave Technology*, Mar. 1988, vol. 6, No. 3, pp. 428–436.

Park, H.G. et al, "Intermodal Coupler using Permanently Photo Induced Grating in Two–Mode Optical Fibre", *Electronic Letters*, Jun. 8, 1989, vol. 25, No. 12, pp. 797–799.

Park, H.G. et al, "All–Optical Intermodal Switch using Periodic Coupling in a Two–Mode Waveguide", *Optics Letters*, Aug. 15, 1989, vol. 14, No. 16, pp. 877–879.

Huang, S.Y. et al, "Perturbation Effects on Mode Propagation in Highly Elliptical Core Two–Mode Fibers", *IEEE Journal of Lightwave Technology*, Jan. 1990, vol. 8, No. 1, pp. 23–33.

J.O. Askautrud and H.E. Engan, "Fiberoptic frequency shifter with no mode change using cascaded acousto–optic interaction regions", Opt. Lett., vol. 15, 649–651 (1990).

Koh, Y.W. et al, "Strain Effects on Two Mode Fiber Gratings", *Optics Letters*, Apr. 1, 1993, vol. 18, No. 7, pp. 497–499.

Yun, S.H. et al, "All–fiber Tunable Filter and Laser based on Two–mode Fiber", *Optics Letters*, Jan. 1996, vol. 21, No. 1, pp. 27–29.

Yun, S.H. et al, "Suppression of Polarization Dependence in a Two–Mode Fiber Acousto–Optic Device", *Optics Letters*, Jun. 15, 1996, vol. 21, No. 12, pp. 908–910.

Kim, H.S. et al, "Longitudinal Mode Control in Few–Mode Erbium–Doped Fiber Lasers", *Optics Letters*, Aug. 1, 1996, vol. 21, No. 15, pp. 1144–1146.

Jeon, M.Y. et al, "An Electronically Wavelength–Tunable Mode–Locked Fiber Laser Using an All–Fiber Acoustooptic Tunable Filter", *IEEE Photonics Technology Letters*, Dec. 1996, vol. 8, No. 12, pp. 1618–1620.

Kim, H.S. et al, "All–fiber acousto–optic tunable notch filter with electronically controllable spectral profile", *Optics Letters*, Oct. 1, 1997, vol. 22, No. 19, pp. 1476–1478.

Yun, S.H. et al, "Wavelength–Swept Fiber Laser with Frequency Shifted Feedback and Resonantly Swept Intra–Cavity Acoustooptic Tunable Filter", *IEEE Journal of Selected Topics in Quantum Electronics*, Aug. 1997, vol. 3, No. 4, pp. 1087–1096 (Invited Paper).

Jeon, M.Y. et al, "Harmonically mode–locked fiber laser with an acoutso–optic modulator in a Sagnac loop and Faraday rotating mirror cavity", *Optics Communications*, Apr. 15, 1998, vol. 149, pp. 312–316.

Kim, H.S. et al, "Actively gain–flattened erbium–doped fiber amplifier over 35nm by using all–fiber acoustooptic tunable filters", *IEEE Photonics Technology Letters*, Jun. 1998, vol. 10, No. 6, pp. 790–792.

Hwang, I.K. et al, "Long–period fiber gratings based on periodic microbends", *Optics Letters*, Sep. 15, 1999, vol. 24, No. 18, pp. 1263–1265.

Yun, S.H. et al, "Dynamic Erbium–Doped Fiber Amplifier Based on Active Gain Flattening with Fiber Acoustooptic Tunable Filters", *IEEE Photonics Technology Letters*, Oct. 1999, vol. 11, No. 10, pp. 1229–1231.

H.E. Engan, T. Myrtveit, and J.O. Askautrud, "All–fiber acousto–optic frequency shifter excited by focused surface acoustic waves", Opt. Lett., vol. 16, 24–26 (1991).

H.E. Engan, D.Östling, P.O. Kval, and J.O. Askautrud, "Wideband operation of horns for excitation of acoustic modes in optical fibers", Proc. OFS(10), Glasgow, 11th–13th Oct. 1994, 568–571 (SPIE Proc. 2360).

D. Östling and H.E. Engan, "Narrow–band acousto–optic tunable filtering in a two–mode fiber", Opt. Lett., vol. 20, 1247–1249 (1995).

H.E. Engan, "Analysis of polarization mode coupling by acoustic torsional waves in optical fibers", J. Opt. Soc. Am. A., vol. 13, 112–118 (1996).

Blake, J.N. et al, "All–Fiber Acousto–Optic Frequency Shifter using Two–Mode Fiber", *Proceedings of the SPIE Fiber Optic Gyros*, Sep. 1986, vol. 719, pp. 92–100.

Blake, B.Y. et al, "Acousto–Optic Frequency Shifting in Two–Mode Optical Fibers", *OFS '86, Tokyo, Japan*, Oct. 8–10, 1986, pp. 159–162.

Engan, H.E. et al, "Optical Frequency Shifting in Two–Mode Optical Fibers by Flexural Acoustic Waves", *IEEE 1986 Ultrasonics Symposium*, Nov. 17–19, 1986, pp. 435–438.

Huang, S.Y. et al, "Mode Characteristics of Highly Elliptical Core Two–Mode Fibers under Purterbations", *OFS '88, New Orleans, Louisiana*, Jan. 27–29, 1988, pp. 14–17.

Kim, B.Y. et al, "Few–Mode Fiber Devices", *OFS '88, New Orleans, Louisiana*, Jan. 27–29, 1988, pp. 146–149, (Invited Paper).

Kim, B.Y. et al, "Fiber–Optic Device Reasearch at Stanford University", *Proceedings SPIE, Fiber Optic and Laser Sensors, Boston Massachusetts*, Sep. 5–7, 1989, vol. 1169, pp. 10–15, (Invited Paper).

Koh, Y.W. et al, "Mode Coupling Fiber Gratings for Fiber Optic Devices", *OFS–9, Firenze, Italia*, May 4–6, 1993, pp. 35–38.

Yun, S.H. et al, "All–Fiber Acousto–Optic Tunable Filter", *OFC '95, San Diego, California*, Feb. 26–Mar. 3, 1995, pp. 186–187.

Yun, S.H. et al, "Electronically Tunabole Fiber Laser Using All–Fiber Acousto–Optic Tunable Filter", *IOOC '95 (10$^{th}$ International Conference on Integrated Optics and Optical Fibre Communication) Hong Kong*, Jun. 26–30, 1995, pp. 22–23.

Yun, S.H. et al, "Polarization Dependence of Two–Mode Fiber–Acousto–Optic Device", *OFS*–11, *Sapporo, Hokkaido, Japan*, May 21–24, 1996, pp. 478–481.

D. Östling and H.E. Engan: "Spectral flattening by an all–fiber acousto–optic tunable filter", 1995 IEEE Ultrasonics Symposium, 837 –840.

D. Östling and H.E. Engan: "Broadband spatial mode conversion by chirped fiber bending", Opt. Lett., vol. 21, 192– 194 (1996).

D. Östling and H.E. Engan: "Polarization–selective mode coupling in two–mode Hi–Bi fibers", Journal of Lightwave Technology, vol. 15, 312–320 (1997).

D. Östling, B. Langli, and H.E. Engan: "Intermodal beat lengths in birefringent two–mode fibers", Opt. Lett., vol. 21, 1553 –1555 (1996).

H.E.Engan, "Acoustic torsional waves used for coupling between optical polarization modes in optical fibers", 1996 IEEE Ultrasonics Symposium, 799–802.

Jeon, M.Y. et al, "Harmonically Mode–Locked Fiber Using an All–Fiber Acousto–Optic Tunable Filter", *OFC '97, Dallas, Texas*, Feb. 16–22, 1997, pp. 166–167.

Yun, S.H. et al, "Wavelength –swept Fiber Laser with Frequency–Shifted Feedback", *OFC '97, Dallas, Texas*, Feb. 16, 1997, pp. 30–31.

Yun, S.H. et al, "Fiber grating sensor array demodulation using wavelength–swept fiber laser", OFS–12, *Williamsburg, Virginia*, Oct. 28–31, 1997.

Hwang, I.K. et al, "All–fiber nonreciprocal comb filter with wavelength tunability", *OFC '98, ThQ5, San Jose*, USA, Feb. 22–27, 1998, pp. 336–338.

Kim, H.S. et al, "Dynamic gain equalization of erbium–doped filter amplifier with all–fiber–acousto–optic tunable filters", *OFC '98, WG4, San Jose*, USA, Feb. 22–27, 1998, pp. 136–138.

Koh, Y.W. et al, "Broadband Polarization–Insensitive All–Fiber Acousto–Optic Modualtor", *OFC '98, WM50, San Jose*, USA, Feb. 22–27, vol. 2, pp. 239–240.

Oh, K. et al., "Characterization of elliptic core fiber acousto–optic tunable filters operated in the single mode and the multi–mode range", *OFC '98, WM59, San Jose*, USA, vol. 2, pp. 250–251.

Yun, S.H. et al, "Generation of self–starting mode–locked pulses in wavelength–swept fiber lasers", *CLEO/IQEC '98, San Francisco, USA, May* 3–8, 1998.

Hwang, I.K. et al, "Long–Period Gratings based on Arch–induced Microbends", *OECC '98, Chiba, Japan*, Jul. 12–16, 1998, pp. 144–145.

Kim, B.Y. et al, "Fiber Based Acousto–Optic Filters", *OFC/IOOC '99, San Diego, USA*, Feb. 21–26, 1999, pp. 199–201, (Invited Paper).

Hwang, I.K. et al, "Profile–controlled long–period fiber gratings based on periodic microbends", *OFC/IOOC '99, San Diego, California*, Feb. 21–26, 1999, pp. 177–179.

Park, H.S. et al, "All–fiber add–drop multiplexer using a tilted fiber Bragg grating and mode–selective couplers", *OFC/IOOC '99, San Diego, California, USA*, Feb. 21–26, 1999, TuH6, pp. 91–93.

Kim, B.Y., "Acousto–optic Components for WDM Applications", *IEEE/LEOS Summer Topical Meetings, San Diego, USA*, Jul. 26–28, 1999, pp. 47–48, (Invited Paper).

Kim, B.Y. "Acousto–optic filters for fiber systems", *ICO–128, San Francisco, USA*, Aug. 2–6, 1999, pp. 92–93, (Invited Paper).

Song, K.Y. et al, "High Performance Fused–type Mode Selective Coupler for Two–mode Fiber Devices", *OFC 2000, Baltimore, USA*, Mar. 5–10, 2000, vol. 37 , TuB5.

Risk, W.P. et al, "Acousto–optic frequency shifting in birefringent fiber", *Optics Letters*, 1984, vol. 9, No. 7, pp. 309–311.

Birks, T.A. et al, "Four–port fiber frequency shifter with a null taper coupler", *Optics Letters*, 1994, vol. 19, No. 23, pp. 1964–1966.

Berwick, M. et al, "Coaxial optical–fiber frequency shifter", *Optics Letters*, Feb. 15, 1992, vol. 17, No. 4, pp. 270–272.

Lisboa, O. et al, "New configuration for an optical fiber acousto–optic frequency shifter", *Proc. Soc. Photo–Opt. Instrum. Eng.*, Mar. 13–14, 1990, vol. 1267, pp. 17–23.

Culverhouse, D.O. et al, "Four port fused taper acousto–optic device using standard single mode telecommunication fiber", *Electronic Letters*, Jul. 20, 1995, vol. 31, No. 15, pp. 1279–1280.

Culverhouse, D.O. et al, "Low–loss all–fiber acousto–optic tunable filter", *Optic Letters*, 1997, vol. 22, No. 2, pp. 96–98.

Dimmick, T.E. et al, "Compact all–fiber acoustooptic tunable filters with small bandwidth–length product", *IEEE Photonics Technology Letters*, Sep. 2000, vol. 12, No. 9, pp. 1210–1212.

D. Östling and H.E. Engan: "Acousto–optic tunable filters in two–mode fibers", Optical Fiber Technology, vol. 3, 177– 183 (1997).

B. Langli, P. G. Sinha and K. Bløtekjær, "*Acousto–Optic Mode Coupling of Partially Coherent Light in Two–Mode Fibers*", Optical Review, vol. 4, No. 1A, pp. 121–129, Jan./Feb. 1997.

J. Blake and P. Siemsen, "Practical compact high performance fiber–optic frequency shifter", Proc. $9^{th}$ OFS Conference, Firenze, pp. 301–304 (1993).

W. P. Risk, G. S. Kino and H. J. Shaw, "Fiber–optic frequency shifter using a surface acoustic wave incident at an oblique angle", Optics Letters, vol. 11, No. 2, pp. 115–117, 1986.

W. P. Risk and–G. S. Kino, "Acousto–optic fiber–optic frequency shifter using periodic contact with a copropagating surface acoustic wave", Optics Letters, vol. 11, No. 5, pp. 336–338, 1986.

W. P. Risk and G. S. Kino, "Acousto–optic polarization coupler and intensity modulator for birefringent fiber", Optics Letters, vol. 11, No. 1, pp. 48–50, 1986.

W. P. Risk, G.S. Kino and B.T. Khuri–Yakub, "Tunable optical filter in fiber–optic form", Opt. Lett., vol. 11, pp. 578–580 (1986).

Kakarantzas, G. et al, "High strain–induced wavelength tunablility in tapered fibre acousto–optic filters", *Electronics Letters*, Jul. 6, 2000, vol. 36, No. 14, pp. 1187–1888.

Dimmick, T.E. et al, "Narrow–band acousto–optic tunable filter fabricated from highly uniform tapered optical fiber", *Optical Fiber Communication Conference*, 2000, 2000, vol. 4, pp. 25–27.

Russell, P.S.J. et al, "All–Fibre Frequency Shifters, Modulators and Switches", *Lasers and Electro–Optics Europe*, 1998, 1998, p. 349.

Birks, T.A. et al, "Control of bandwidth in fiber acousto–optic tunable filters and other single–mode null coupler devices", *Lasers and Electro–Optics*, 1997, 1997, vol. 11, pp. 444–445.

Culverhouse, D.O. et al, "40–MHz all–fiber acoustooptic frequency shifter", *IEEE Photonics Technology Letters*, Dec. 1996, vol. 8, No. 12, pp.1636–1637.

Birks, T.A. et al, "The acousto–optic effect in single–mode fiber tapers and couplers", *Journal of Lightwave Technology*, Nov. 1996, vol. 14, No. 11, pp. 2519–2529.

Culverhouse, D.O. et al, "All–fibre Acousto–optic Tunable Filter Based On a Null Coupler", *Optical Communication 1996. ECOC '96*, 1996, vol. 3, pp. 317–320.

Birks, T.A. et al, "Low power acousto–optic device based on a tapered single–mode fiber", *IEEE Photonics Technology Letters*, Jun. 1994, vol. 6, No. 6, pp. 725–727.

Zayer, N.K. et al, "In situ ellipsometric monitoring of growth of zinc oxide thin films with applications to high–frequency fiber acousto–optic components", *Lasers and Electro–Optics*, 1998. *CLEO '98*, 1998, pp. 251–252.

Pannell, C.N. et al, "In–fiber and fiber–compatible acoustooptic components", *Jouranl of Lightwave Technology*, Jul. 1995, vol. 13, No. 7, pp. 1429–1434.

Abdulhalim, I. et al, "Acoustooptic in–fiber modulator using acoustic focusing", *IEEE Photonics Technology Letters*, Sep. 1993, vol. 5, No. 9, pp. 999–1002.

S.F. Su, R. Olshansky, D.A. Smith and J.E. Baran, "Flattening of erbium–doped fibre amplifier gain spectrum using an acousto–optic tunable filter", Electron. Lett., vol. 29, pp. 477–478 (1993).

Yijiang Chen, "Acousto–optic frequency shifter using coaxial fibers", Optical and Quant. Elect., vol. 21, pp. 491–198 (1989).

J. Ji, D. Uttam and B. Culshaw, "Acousto–optic frequency shifting in ordinary single–mode fibre", Electronics Letters, vol. 22, No. 21, pp. 1141–1142, 1986.

C. N. Pannell, R. P. Tatam, J. D. C. Jones and D. A. Jackson, "Optical frequency shifter using linearly birfringent monomode fibre", Electronics Letters, vol. 23, No. 16, pp. 847–848, 1987.

K. Nosu, H. F. Taylor, S. C. Rashleigh and J. F. Weller, "Acousto–optic phase modulator and frequency shifter for single–mode fibers", Ultrasonics Symposium, pp. 476–481, 1983.

Liu, W.F. et al., "Switchable narrow bandwidth comb filter based on a acoustooptic superlattice modulator in Sinc–sampled fiber gratings", CLEO '99, pp. 77–78.

Huang, D.W. et al., "Q–Switched all–fiber with an acoustically modulated fiber attenuator", *IEEE Photonics Technology Letters*, Sep. 2000, vol. 12, No. 9, pp. 1153–1155.

Patterson, D.B. et al., "Frequency Shifting in Optical Fiber Using a Saw Horn", *IEEE Photonics Technology Letters*, 1990, pp. 617–620.

Huang, D.W., et al., "Reflectivity–Tunable Fiber Bragg Grating Reflectors", *IEEE Photonics Technology Letters*, Feb. 2000, vol. 12, No. 2, pp. 176–178.

Liu, W.F., et al., "100% Efficient Narrow–Band Acoustooptic Tunable Reflector Using Fiber Bragg Grating", *IEEE Photonics Technology Letters*, Nov. 19998, vol. 16, No. 11, pp. 2006–2009.

Patterson, D.B., et al, "Noninvasive Switchable Acousto–Optic Taps for Optical Fiber", *IEEE Photonics Technology Letters*, Sep. 1990, vol. 8, No. 9, pp. 1304–1312.

Yun, S. H., et al., "Dynamic Erbium–Doped Fiber Amplifier with Automatic Gain Flattening", *Department of Physics, Korea Advanced Institute of Science and Technology*, pp. PD28–1–PD28–3.

* cited by examiner

OPTICAL FIBER FOR BROADBAND OPTICAL DEVICES AND OPTICAL FIBER DEVICES USING THEREOF

TECHNICAL FIELD

The present invention relates to an optical fiber, and more particularly to an optical fiber having a normalized frequency applicable to a broadband optical fiber device.

The present invention also relates to an optical fiber device, and more particularly to broadband. polarization-independent, low-loss optical fiber devices which are achieved by using the aforementioned optical fiber along with a mode stripper or a mode selective coupler.

BACKGROUND ART

It is well known that a two mode optical fiber device using a mode coupling is between fundamental mode LP01 and second mode LP11 can be applied to an optical frequency modulator or a wavelength-tunable filter. The wavelength band width of this two mode optical device is determined by the dispersion of the beat length of the two coupled modes. Up to the present, the two mode optical fiber device has been used as a filter having a characteristic of a relatively narrow band wavelength with its linewidth being generally same or less than 10 nm. However, the wavelength dependency of the beat length disappears at a wavelength in which the two space modes have a same group velocity. That is, a device using a coupling between these two modes can be operated in a broad wavelength band, since the dispersion of the beat length is small in the vicinity of this wavelength.

In respect to a circular core optical fiber having a step refractive index, the normalized frequency which is dimensionless value defined in a wave guide is represented by the following equation 1:

$$V = \frac{2\pi r_{co}}{\lambda}\sqrt{n_{co}^2 - n_{cl}^2} \quad \text{(equation 1)}$$

where, V is a normalized frequency, $r_{co}$ is a radius of the core, $\lambda$ is a light wavelength in vacuum, $n_{co}$ is a refractive index of the core, and $n_{cl}$ is a refractive index of the cladding, respectively. In the case of a circular core optical fiber having a step refractive index, the first normalized frequency has a value of about 3 in which the dispersion of the beat length between LP01 mode and LP11 mode reaches a minimum. In the case of high order modes which are higher than LP11 mode, the normalized frequency has a value which is same or more than 3 in which the dispersion of the beat length is the minimum depending on the mode. In turn, in a single mode optical fiber where coupling of LP01 mode propagating along the core and a cladding mode propagating along the cladding, the normalized frequency has a value which is same or less than 2.4 in which the dispersion is the minimum. For example, in the case of a common circular core optical fiber having a step refractive index, a normalized frequency with the dispersion of the beat length between LP01 mode of the core and LP11 mode of the cladding being the minimum has a value of about 0.7, and a normalized frequency with the dispersion of the beat length between LP01 mode and LP14 mode being the minimum has a value of about 1.3.

That is, the exact value of the normalized frequency, where the dispersion is the minimum, is determined depending on the structure of an optical fiber, i.e., a distribution of the refractive index. Therefore, a broadband optical fiber device can be achieved, by properly adjusting a core radius, a core refractive index and a cladding refractive index that are structural parameters of an optical fiber, to have a normalized frequency value in which the dispersion of the beat length between LP01 and LP11 modes are the minimum in a broad optical wavelength band.

Accordingly, it is an object of the present invention to provide an optical fiber having a normalized frequency value applicable to optical devices which operate in a broad wavelength band.

It is other object of the present invention to achieve various broadband, polarization-independent, low-loss optical fiber devices by using the aforementioned optical fibers.

DISCLOSURE OF INVENTION

To achieve the above object, there is provided an optical fiber having a normalized frequency value, in which the dispersion of the beat length between a first and a second modes is a minimum in an optical signal wavelength band, by adjusting structural parameters of the optical fiber including a core radius, a core refractive index and a cladding refractive index, so that the beat length between the first and second modes does not depend on an optical wavelength in the operating wavelength band of the passing light.

The optical fiber is preferably selected by an elliptical core two mode optical fiber which has an ellipticity same or less than 0.9. The ellipticity is referred to a ratio of the minor axis to the major axis in this case.

Otherwise, the optical fiber may preferably be selected as a single mode optical fiber so that the first and second modes correspond to the core and cladding modes, respectively.

The optical fiber device of the present invention further comprises a single mode optical fiber for introducing incident light into the above-described structural parameter adjusted optical fiber; acoustic wave generating means which generates a flexural acoustic wave in the structural parameter adjusted optical fiber; and output mode stripping/selecting means, connected to the optical fiber with structural parameters adjusted, for eliminating or selecting a particular mode of the light that passes therethrough.

In this case, the structural parameter adjusted optical fiber may also use an elliptical core two mode optical fiber which has an ellipticity same or less than 0.9, or a single mode optical fiber. In case of using the single mode optical fiber, the first and second modes correspond to the core and cladding modes, respectively.

In constituting the optical fiber device, input mode stripping/selecting means may be further provided between the single mode optical fiber and the structural parameter adjusted optical fiber.

Alternatively, as the input mode selecting means, a mode stripper may be used which is an optical fiber wound with a small diameter to remove high order modes with bending losses.

The input mode selecting means can be a mode selective coupler made with the structural parameter adjusted optical fiber and another single mode optical fiber which has the same effective refractive index as the refractive index of the second mode of the structural parameter adjusted optical fiber, so that the optical fiber device can be operated as a 1×2 optical switch.

As the input mode selecting means, a mode stripper may be used which is an optical fiber where the single mode optical fiber and the structural parameter adjusted optical fiber spliced together and tapered at the spliced portion, to allow only one mode to pass.

The output mode stripping selecting means for the passing light may be comprised of a mode selective coupler made with a single mode optical fiber which have same effective refractive index as the refractive index of the second mode in the structural parameter adjusted optical fiber, so that the optical fiber device can be operated as a 1×2 optical switch.

The output mode stripping/selecting means for the passing light may be comprised of a mode stripper which is an optical fiber wound with a small diameter to strip high order modes with bending loss. or a mode stripper which is a tapered optical fiber to allow only one mode to pass. so that the optical fiber device can be operated as a 1×1 optical switch.

If the mode stripping/selecting means for the passing light is comprised of a mode selective coupler, the optical fiber device of the present invention can perform a function of a 2×2 optical switch or an add/drop multiplexer.

Furthermore, the single mode introducing optical fiber and the structural parameter adjusted optical fiber are preferably inserted into a tube, the material of which has a similar thermal expansion coefficient as the optical fibers, in order to prevent length variation of the optical fibers depending on temperature variation and to protect the optical fibers.

In addition, the above-described several optical devices may be used in connection to perform a function of a matrix switch, or otherwise only one may be used to perform a function of a loop-back switch which sends back optical signal inputs.

BRIEF DESCRIPTION OF DRAWINGS

Preferred embodiments of the present invention will be described hereinafter in reference to the appended drawings.

BEST MODE FOR CARRYING OUT THE INVENTION

Though several optical fiber devices may be achieved in accordance with the aspect of the present invention, an explanation will be made about an optical switch in this embodiment.

The inventors developed a broadband, low-loss, and polarization-independent acousto-optic amplitude modulator by using a two mode optical fiber designed to have a normalized frequency of about 3 around 1550 nm. This device can be useful in wavelength-division multiplexing (WDM) communication systems where, for example, signal power variations at erbium-doped fiber amplifiers (EDFAs), associated with channel add/drop, need to be controlled to avoid output power transients. With the addition of a mode selective coupler, the device can also be operated as a 1×2 switch.

Figure 1:
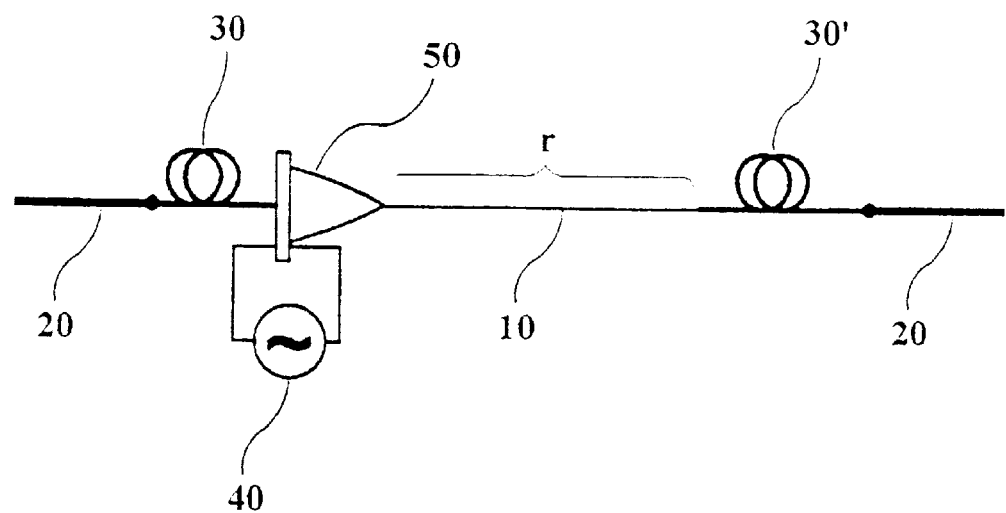
FIG. 1 is a schematic configuration of an optical switch according to an embodiment of the present invention.

FIG. 1 is a schematic configuration showing an optical switch based on an acousto-optic mode coupling via the flexural acoustic wave. A mode coupling occurs when the wavelength of an acoustic wave propagating along an optical fiber matches to the beat length between modes. A two mode optical fiber 10 having an index difference of about $0.007(n_{co}-n_{cl} \approx 0.007)$ between refractive indexes of the core and the cladding, a core radius of 5 $\mu$m, and a cladding diameter of 80 $\mu$m, is spliced to a conventional single mode optical fiber 20 with a minimal core misalignment to minimize the unwanted excitation of the second-order mode. Mode strippers 30, 30' employing a tight bending of the two mode fiber ensure only the fundamental mode to enter and exit the 25 mm-long acousto-optic interaction region r where the polymer jacket of the optical fiber is stripped off. In order to introduce a flexural acoustic wave in the acousto-optic interaction region r, an acoustic horn 50 is used, and the wavelength of the acoustic wave can be adjusted by a radio frequency (hereinafter referred to "rf") signal generator 40, the signal of which is applied to the acoustic horn 50. The performance of such an optical switch reacts sensitively to any length variation of the optical fiber depending on temperature variation. Therefore, in order to eliminate any length variation of the optical fiber depending on temperature variation and to protect it, the optical fiber portion is preferably inserted into a certain material, such as a quartz or glass tube (not shown), having the same thermal expansion coefficient as the optical fiber.

Figure 2A:
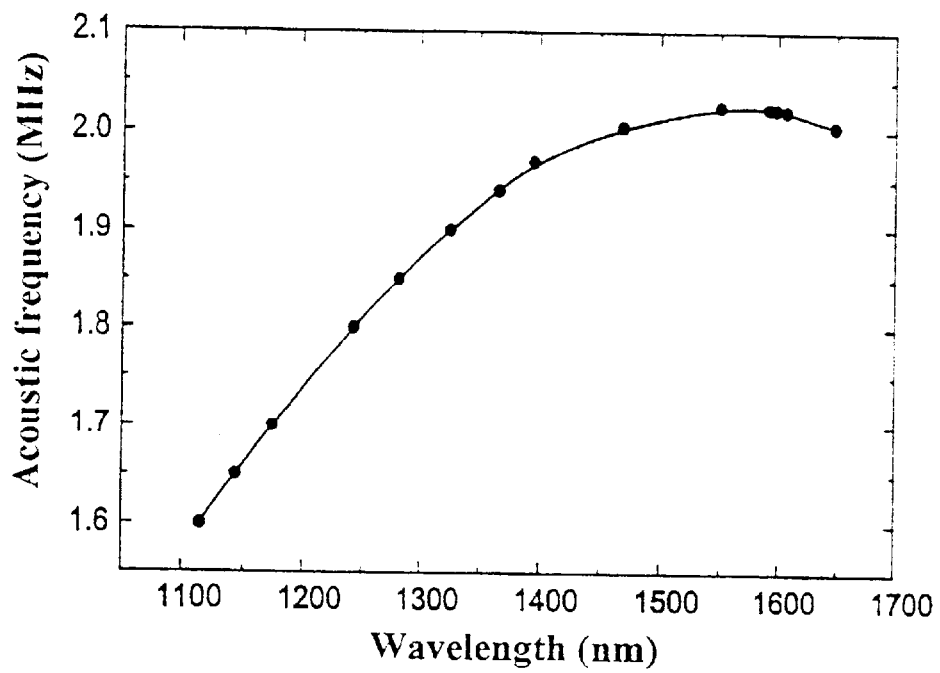
FIG. 2A is a graph showing an example of a phase-matching acoustic frequency which is approximately inversely proportional to the square of beat length as a function of the optical wavelength and FIG. 2B is a graph showing transmission characteristics of the optical switch illustrated in FIG. 1.

FIG. 2A is a graph showing an example of a phase-matching acoustic frequency which is approximately inversely proportional to the square of beat length as a function of the optical wavelength. Referring to FIG. 2A, it can be understood that the beat length has the minimum value in the vicinity of about 1550 nm.

Figure 2B:
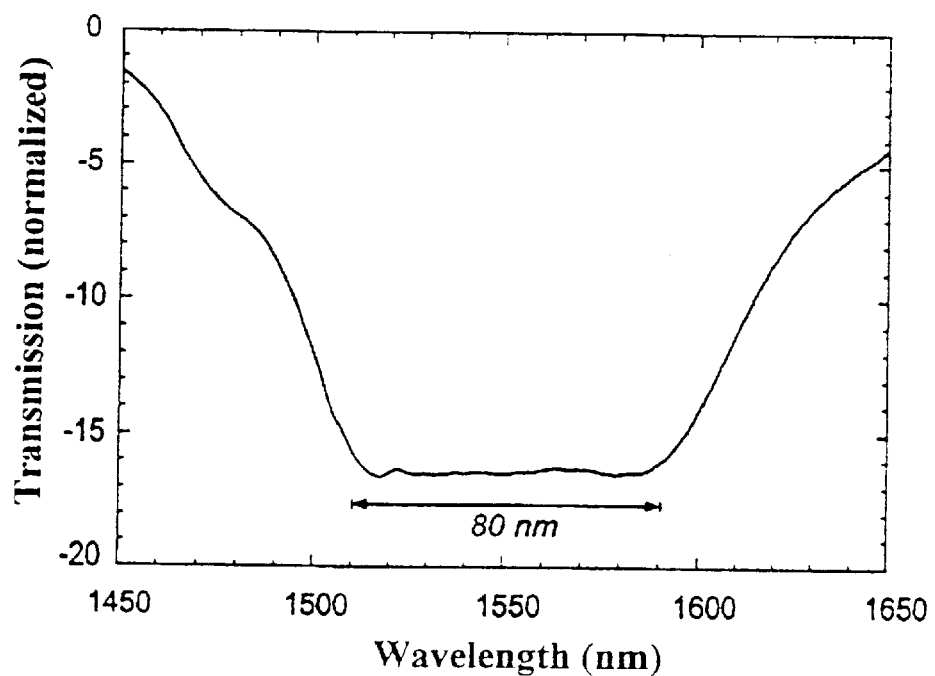

FIG. 2B is a graph showing transmission characteristics of the optical switch illustrated in FIG. 1. Referring to FIG. 2B, it can be seen that uniform mode coupling is observed over 80 nm from 1510 to 1590 nm with only a fraction of a 1 dB in rejection efficiency. When rf signal is not applied, the insertion loss due to a spliced portion and the mode stripper is about 1 dB. When the rf signal is applied, an extinction ratio is shown as same or more than 16 dB, independent of the polarization state.

Figure 3:
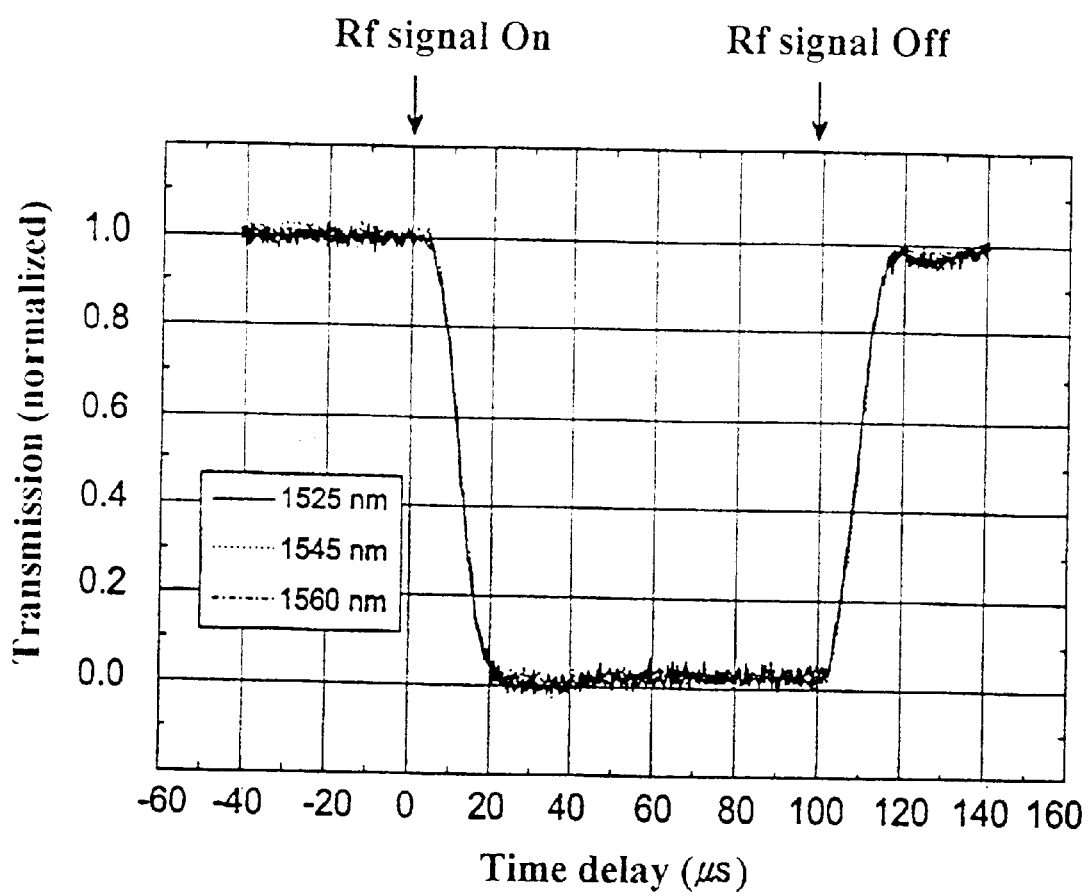
FIG. 3 is a graph showing switching characteristics of the optical switch illustrated in FIG. 1.

FIG. 3 is a graph illustrating switching characteristics of the optical switch shown in FIG. 1, measured using a laser diode and an amplitude modulated rf source.

Referring to FIG. 3, it can be understood that lag times of switching on and off (in the range of 10% to 90%) are all 11 $\mu$s, in which the initial switching lag time of about 7 $\mu$s corresponds to the acoustic wave propagation time in the acoustic horn shown in FIG. 1. Switching characteristics are almost the for three wavelengths of 1525, 1545 and 1560 nm.

Therefore, according to the present invention, an optical fiber switch may be easily achieved, which operates in a broadband independently on polarization and has low loss. In particular, this device may be applied to an output power control of an erbium doped optical fiber amplifier, a gaining control, a n×n matrix switch, and an on/off switch with low cost which is applicable to the modulation in a low transmission rate(<100 kHz) system, since this devices uses optical fibers only.

Although the invention has been described with respect to a preferred embodiment, it is obvious for those skilled in the art that equivalent alterations and modifications will fall within the scope of the present invention. The scope of the present invention will be limited only by the expression of the appended claims.

What is claimed is:

1. An optical fiber device comprising a single mode optical fiber for introducing incident light;

an optical fiber which is connected to said single mode optical fiber and has a normalized frequency value, in which the dispersion of the beat length between a first and a second modes is a minimum in an optical signal wavelength band, by adjusting structural parameters of the optical fiber including a core radius, a core refractive index and a cladding refractive index, so that the beat length between said first and second modes does not depend on an optical wavelength in the operating wavelength band of the passing light;

acoustic wave generating means for generating a flexural acoustic wave in said optical fiber with structural parameters adjusted; and output mode stripping/selecting means, connected to said optical fiber with structural parameters adjusted, for eliminating or selecting a particular mode of the light that passes therethrough.

2. An optical fiber device of claim 1, wherein further comprising an input mode selecting means provided between said single mode optical fiber and structural parameter adjusted optical fiber to adjust the mode of the incident light.

3. The optical fiber device of claim 2, wherein said input mode selecting means is a mode stripper which is an optical fiber wound with a small diameter to remove high order modes with bending loss.

4. The optical fiber device of claim 2, wherein said input mode selecting means is a mode selective coupler made with said structural parameter adjusted optical fiber and another single mode optical fiber which has the same effective refractive index as the refractive index of said second mode of said structural parameter adjusted optical fiber, so that said optical fiber device can be operated as a 1×2 optical switch.

5. The optical fiber device of claim 2, wherein said input mode selecting means is a mode stripper which is an optical fiber where said single mode optical fiber and said structural parameter adjusted optical fiber spliced together and tapered at the spliced portion to allow only one mode to pass.

6. The optical fiber device of claim 2, wherein said output mode stripping/selecting means for said passing light is comprised of a mode selective coupler made with a single mode optical fiber which have same effective refractive index as the refractive index of said second mode in said structural parameter adjusted optical fiber, so that said optical fiber device can be operated as a 1×2 optical switch.

7. The optical fiber device of claim 2, wherein said output mode stripping/selecting means for said passing light is comprised of a mode stripper which is an optical fiber wound with a small diameter to strip high order modes with bending loss, or a mode stripper which is a tapered optical fiber to allow only one mode to pass, so that said optical fiber device can be operated as a 1×1 optical switch.

8. The optical fiber device of claim 2, wherein said input mode selecting means is a mode selective coupler made with said structural parameter adjusted optical fiber and another single mode optical fiber which has same effective refractive index as the refractive index of said second mode of said structural parameter adjusted optical fiber, and wherein said output mode stripping/selecting means for said passing light is comprised of another mode selective coupler, so that said optical fiber device can be operated as a 2×2 optical switch or an add/drop multiplexer.

9. The optical fiber device of claim 2, wherein said single mode introducing optical fiber and said structural parameter adjusted optical fiber are inserted into a tube, the material of which has a similar thermal expansion coefficient as said optical fibers, in order to prevent length variation of said optical fibers depending on temperature variation and to protect said optical fibers.

10. The optical fiber device of claim 1, wherein said structural parameter adjusted optical fiber is an elliptical core two mode optical fiber and has its ellipticity same or less than 0.9.

11. The optical fiber device of claim 1, wherein said structural parameter adjusted optical fiber is a single mode optical fiber, and wherein said first and second modes correspond to the core and cladding modes, respectively.

12. The optical fiber device of claim 1, wherein said single mode introducing optical fiber and said structural parameter adjusted optical fiber are inserted into a tube, the material of which has a similar thermal expansion coefficient as said optical fibers, in order to prevent length variation of said optical fibers depending on temperature variation and to protect said optical fibers.

* * * * *